United States Patent [19]
Lacey

[11] Patent Number: 4,865,499
[45] Date of Patent: Sep. 12, 1989

[54] SELF-PLUGGING BLIND RIVET

[75] Inventor: Ramond D. Lacey, Essendon, England

[73] Assignee: Avdel Limited, Hertfordshire, England

[21] Appl. No.: 164,974

[22] Filed: Mar. 7, 1988

[30] Foreign Application Priority Data

Mar. 19, 1987 [GB] United Kingdom ............... 8706605

[51] Int. Cl.⁴ ..................... F16B 13/04; F16B 19/00
[52] U.S. Cl. ..................................... 411/34; 411/43; 411/361
[58] Field of Search ................. 411/34–38, 411/43, 41, 55, 360, 361, 432, 70

[56] References Cited

U.S. PATENT DOCUMENTS 2,061,628 11/1936 Huck .
2,061,629 11/1936 Huck .
2,527,307 10/1950 Huck .
3,204,517 9/1965 Looker .................................. 411/57
3,915,052 10/1975 Ruhl .................................... 411/361
4,376,604 3/1983 Pratt et al. .......................... 411/70

FOREIGN PATENT DOCUMENTS

WO86/06448 11/1986 PCT Int'l Appl. ................. 411/361
424241 3/1935 United Kingdom .
2168122 6/1986 United Kingdom ................. 411/43

Primary Examiner—Neill R. Wilson
Attorney, Agent, or Firm—Oblon, Spivak, McClelland, Maier & Neustadt

[57] ABSTRACT

The rivet comprises a tubular rivet body of deformable material, and an elongate stem extending through the bore of the body. The body comprises a cylindrical shank and an enlarged rivet head at one end of the shank. The rivet head may be integral with, or separate from, the shank. The stem includes a plug, and a stem-tail connected to the plug by a frangible breakneck. The plug has a terminal head for abutting the shank, whereby the shank can be axially compressed on pulling the stem-tail and thereby deformed to form a blind head, and a locking groove circumferentially of the plug for receiving material of the rivet head which, during installation of the rivet, will be swaged radially inwardly into the locking groove to lock the plug in the body. The locking groove is of helical form, as with a screw thread, and enables the plug to be removed from the body by rotation, thus facilitating disassembly of the installed rivet and its removal from a workpiece. Forming the rivet head separately from the shank further facilitates removal of the body from the workpiece after removal of the plug.

7 Claims, 4 Drawing Sheets

SELF-PLUGGING BLIND RIVET

BACKGROUND OF THE INVENTION

This invention relates to fasteners of the type known generally as self-plugging blind rivets, and more particularly to a self-plugging blind rivet of the kind comprising a tubular rivet body able to extend through a workpiece comprising members which are to be fastened together, and having a preformed head at one end of the body for engaging one face of the workpiece, the rivet including an elongate stem which extends through a bore in the rivet body, and has means at one of its ends for deforming part of the body remote from the preformed head so as to form a blind head for engaging an opposite face of the workpiece, whereby the members of the workpiece may be clamped between the preformed head and the blind head, and wherein the stem has a locking groove for receiving material of the preformed head which may be deformed radially inwardly after formation of the blind head, whereby the stem may be retained by, and plug the bore of, the rivet body.

Such blind rivets are well known, and some are formed of high strength material and constructed so as to be durable in use, and are therefore suitable for fastening members of a workpiece which will be subjected to rigorous treatment, as, for example in the contruction of motor-driven road vehicles.

However, it is sometimes necessary, for example in repair work, to remove a blind rivet after it has been installed. If the blind rivets are durable, and not constructed to facilitate disassembly, this can be difficult to achieve.

SUMMARY OF THE INVENTION

We have now devised a blind rivet which is so constructed as to facilitate disassembly, after installation of the blind rivet, of members of a workpiece fastened together thereby, and which in use is not substantially less strong or durable than a comparable conventional fastener having no means for facilitating disassembly of the fastened members.

According to one aspect of the invention, there is provided a self-plugging blind rivet comprising a tubular rivet body of deformable material, and an elongate stem which extends through the rivet body, the body comprising an elongate shank, and a radially enlarged rivet head at one end of the shank, the stem comprising a stem-tail which projects from the head end of the rivet body, and a plug connected to the stem-tail by a breakneck, the plug having a terminal head remote from the stem-tail for abutting the end of the shank remote from the rivet head, and a helical groove extending circumferentially of the plug from the breakneck towards the terminal head, for receiving material of the body which, on installation of the blind rivet, will be deformed radially inwardly into the helical groove.

The rivet head and shank of the body may be integral with each other.

The rivet head and shank of the body may be non-integral with each other.

The breakneck may form the root of an annular groove into which the helical groove runs.

The helical groove may define, between adjacent turns therof, a helical thread having the form of a conventional screw thread.

BRIEF DESCRIPTION OF THE DRAWINGS

Specific embodiments of the invention will now be described by way of example, and with reference to the accompanying drawings, in which.

DETAILED DESCRIPTION OF THE PREFERRED EMBODIMENTS

Figure 1:
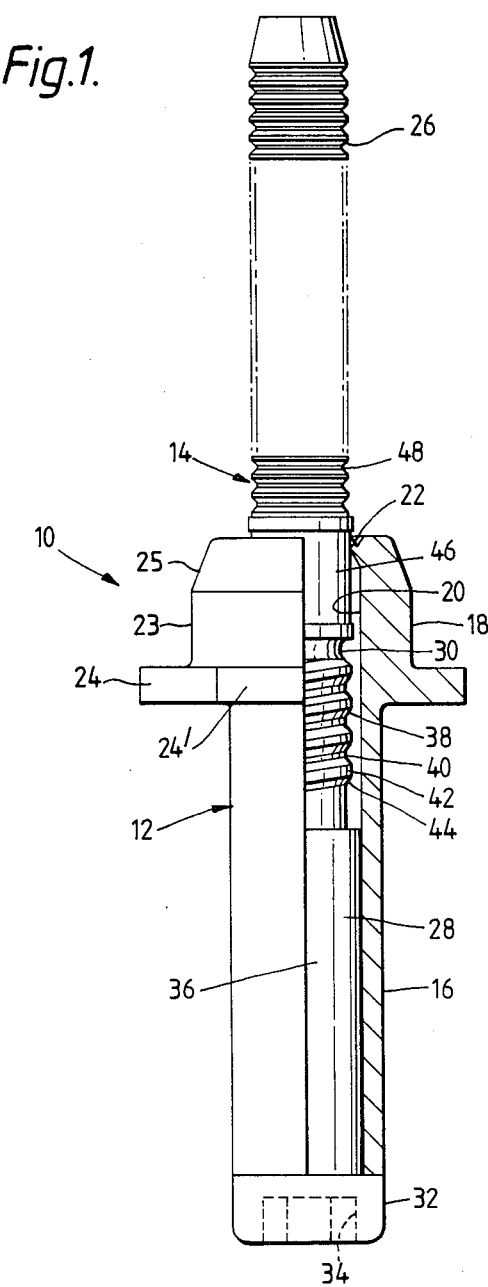
FIG. 1 is an elevation, partly in section, of one embodiment of a blind rivet according to the invention.

Referring now to FIG. 1 of the drawings in the first embodiment of the invention, a blind rivet 10 comprises a rivet body 12 and a stem 14.

The rivet body 12 is formed of annealed steel, and comprises an elongate shank 16, and a radially enlarged rivet head 18 at one end of the shank. The head 18 is integral with the shank 16, and the body is tubular, having a bore 20 extending axially throughout the head and shank. In this embodiment the bore 20 is of substantially constant diameter throughout its length except for a short region of the bore at the end within the head, in which the head has an inwardly protruding annular retaining lip 22 for the purpose of frictionally engaging the stem 14 and retaining the stem within the bore.

The shank 16 is of circular cross-section and of constant external diameter throughout its length.

The rivet head 18 has a swageable crown portion 23 of generally circular shape in cross-section, and having a diameter greater than that of the shank. Between the crown portion 23 and the shank 16, the head 18 is further enlarged radially to provide a wrenching flange 24 the periphery of which is provided with a pair of diametrically opposed wrenching flats 24'. The end of the crown portion remote from the shank is tapered, or radiused inwardly, to provide a lead-in 25 to facilitate the initial entry of the crown portion 23 into a swaging anvil as will become apparent.

The stem 14 is disposed in the bore 20 of the rivet body, and comprises an elongate stem-tail 26, and a plug 28 which is connected to the stem-tail by a narrow breakneck 30 at the root of an annular groove. The breakneck 30 is the weakest part of the stem and has a diameter which is so controlled that the stem will break at the breakneck rather than elsewhere when the pin is subjected to a predetermined tensile force.

The plug 28 has a radially enlarged terminal head 32 at the end remote from the stem-tail. The terminal head has an external diameter substantially the same as that of the shank 16, and has a hexagonal recess 34, providing a plurality of wrenching flats, extending axially into the head, for receiving a hexagonal key-wrench. The terminal head is shaped so as to be able to abut that end (hereinafter referred to as the "tail-end") of the shank 16 which is remote from the rivet head and to transmit an axially compressive force to the shank.

Adjacent to the terminal head, the plug has a smooth cylindrical part 36 able to enter with slight clearance or as a light interference fit into the bore 20 of the shank.

The length of the cylindrical part 36 is somewhat less than the length of the shank.

Between the cylindrical part 36 and the breakneck 30, the plug has a locking part 38. The circumferential surface of the locking part is formed with a helical groove 40 which defines between its adjacent turns a helical rib or thread 42 similar to a conventional screw thread of coarse pitch and having a major diameter substantially the same as that of the bore 20. One end of the helical groove 40 runs out into the annular groove of which the root forms the breakneck 30. The rib or thread 42 presents a locking flank 44 facing generally towards the terminal head 32.

The axial length of the helically grooved locking part 38 is slightly greater than the axial length of the rivet head 18, and the combined length of the cylindrical part 36 and the locking part 38 is slightly greater than the axial length of the shank 16, but appreciably less than the overall length of the rivet body 12.

The stem-tail 26 has a short plain part 46 adjacent to the breakneck, and, through the rest of its length, is provided with a plurality of annular pulling grooves 48, to facilitate gripping and pulling of the stem by means of a suitable tool. A short length of the stem-tail, at the end remote from the plug, is tapered to facilitate insertion of the stem-tail between gripping jaws of an installation tool.

The body 10 and stem 14 are assembled together during manufacture so that the stem-tail 26 projects from the head end of the body, and the plug 28 lies within the bore 20 with the terminal head 32 abutting the tail-end of the body, and the retaining lip 22 frictionally engages the plain part 46 so as to prevent separation of stem and body prior to installation.

Figure 2:
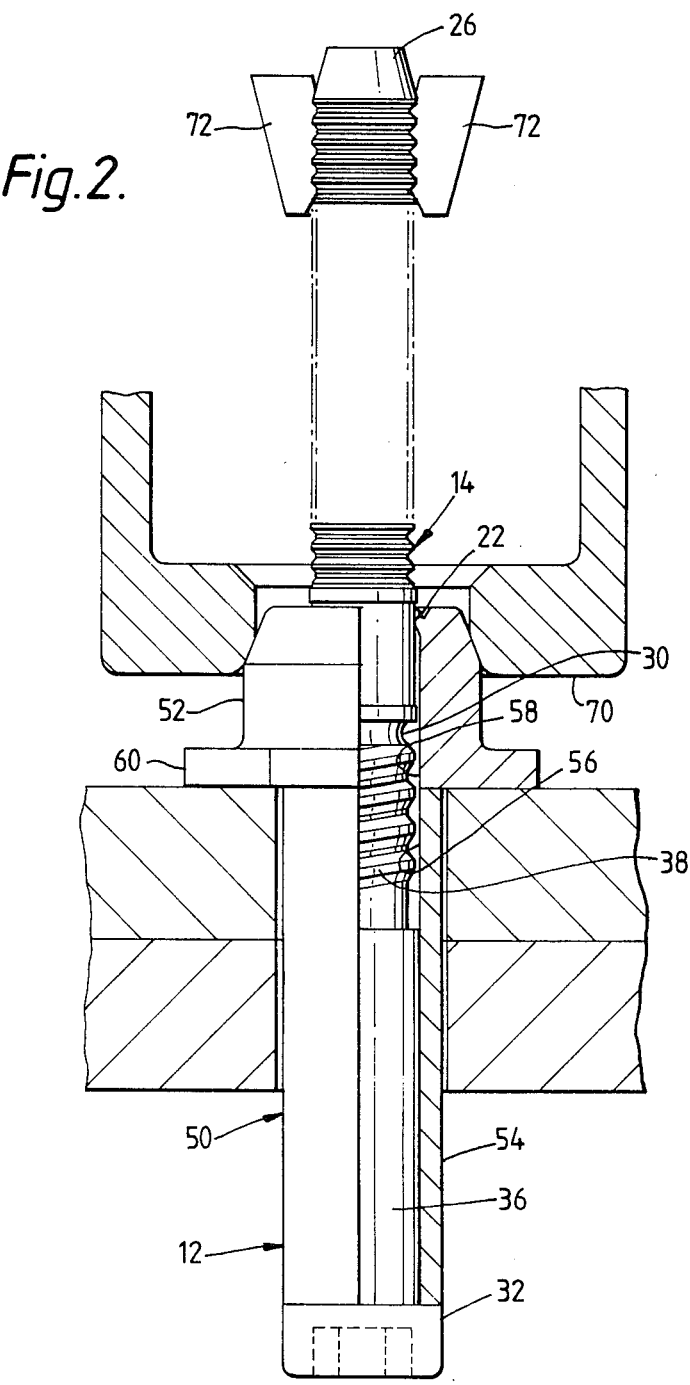
FIG. 2 is an elevation, partly in section, of another embodiment of the invention together with an apertured workpiece in which the blind rivet is to be installed, and part of a tool used for installation of the rivet.

In another embodiment of the invention, illustrated in FIG. 2 of the drawings, a blind rivet 50 is generally similar in construction, and operation during installation, to the rivet 10 and similar parts are indicated by the same references. The rivet 50 includes a stem 14 which is the same as that of the rivet 10. However, in the rivet 50, the rivet body 12 has a rivet head 52 and a shank 54 which are not integral with each other. The shank 54 is a right-cylindrical tube, having a bore 56.

The rivet head 52 is tubular, having a bore 58 of substantially the same diameter as the bore of the shank. In the assembled rivet 50, the bores 56, 58 are aligned and the stem 14 extends through them, with the terminal head 32 abutting one end of the shank and the stem-tail projecting from the head 52, so that the rivet head, shank, and stem are held in the same relationship to each other as those of the rivet 10, the stem being frictionally engaged by an annular retaining lip 22 which protrudes into the bore 58 of the rivet head 52, adjacent the end remote from the shank.

Adjacent to the end of the rivet head 52 which is contiguous with the shank 54, the peripheral surface of the rivet head is radially enlarged to provide a 60 having wrenching flats, the periphery of which is polygonal, and, in this embodiment, hexagonal. The rest of the rivet head constitutes a crown portion 23 the peripheral surface of which is circular.

The blind rivets of both the foregoing embodiments can be installed in the same, conventional, manner and behave in the same manner during installation, as will now be described, with reference to FIGS. 2 to 4, in relation to the installation of the rivet 50.

As is well known, apertured members of a workpiece to be fastened together by means of a blind rivet are brought together with their apertures aligned, and the rivet is inserted into the aligned apertures so that the rivet head abuts one face of the workpiece and the shank extends through the apertures and projects beyond the opposite face of the workpiece by an amount sufficient to enable the projecting part of the shank to be deformed to form a blind head. The blind rivet is then installed by means of a suitable tool having means for gripping and pulling the stem relative to the rivet body, and means for subsequently swaging the rivet head into gripping engagement with the stem.

Thus, referring to FIG. 2, the tool comprises an annular swaging anvil 70, and a pair of stem-gripping and -pulling jaws 72 which are movable relative to the anvil along the axis of the anvil. The stem-tail 26 of the rivet is inserted through the anvil and engaged by the jaws which are then moved relative to the anvil to pull the stem 14, while the rivet head 52 is supported by the anvil, and the shank 54 is, in turn, supported by the rivet head 52.

Figure 3:
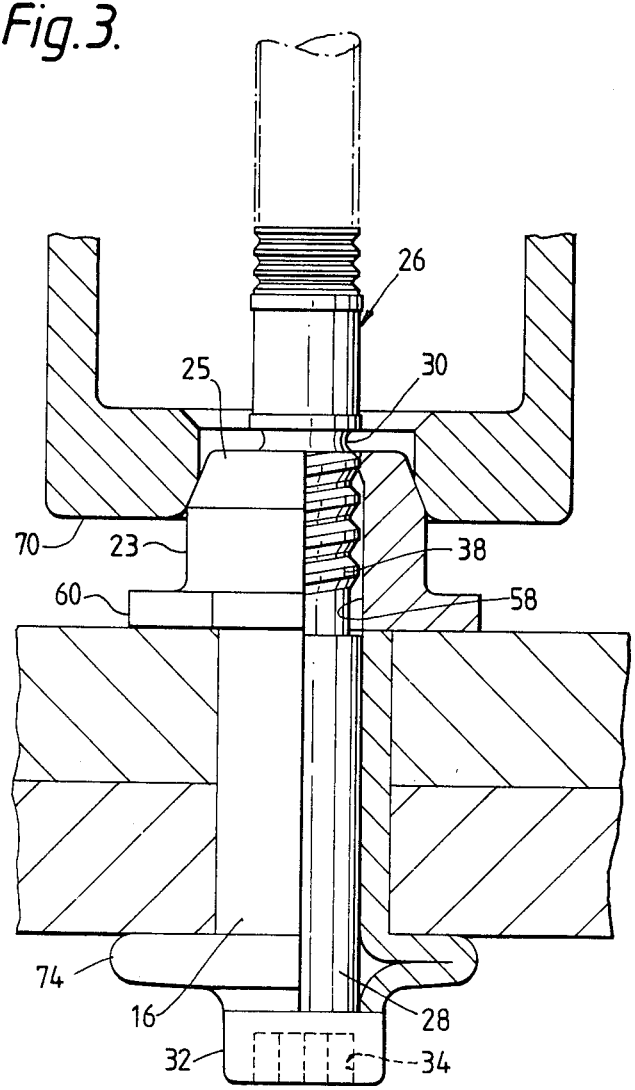
FIG. 3 is a view similar to FIG. 2, illustrating an early stage in the installation of the rivet.
Figure 4:
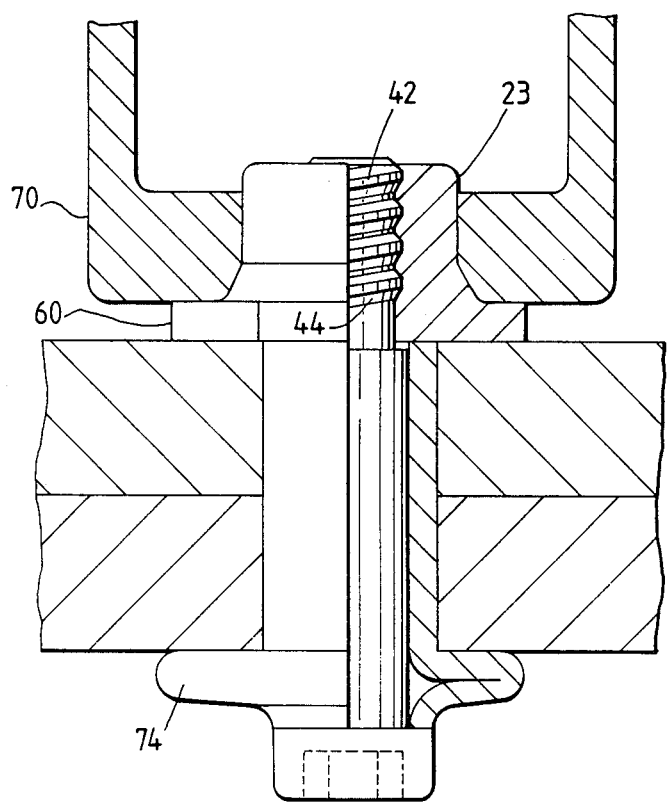
FIG. 4 is a view similar to FIG. 3, showing the final stage in the installation of the rivet.

The shank reacts to the resultant compressive force between the rivet head 52 and the terminal head 32 by becoming bulbed in the region of the shank which projects beyond the workpiece until eventually the projecting part of the shank is thrown into a radially enlarged annular fold, which constitutes a blind head 74, as shown in FIG. 3.

Once this condition is reached, the force required to move the jaws and the stem further, relative to the anvil and the rivet body, increases, and, as increasing force is applied by the tool, the crown portion 23 of the rivet head 52 then begins to enter the anvil and is swaged thereby so that both the external and internal diameters of the crown portion become reduced.

As a result, the rivet head is forced to enter into the helical groove 40 in the locking part of the stem. Eventually, the increasing force applied to the stem reaches a predetermined value at which the breakneck 30 breaks, allowing the stem-tail to be discarded and leaving the rivet installed in the workpiece with the plug and rivet head interlocked by the interengagement between the swaged material of the head 52 and the thread 42, as shown in FIG. 4.

If, subsequently, it should become necessary to disassemble the members of the riveted workpiece, this can be achieved with relative ease by rotating the plug relative to the rivet head in the sense appropriate to withdraw the plug from the head 52, through the shank. This can be achieved conveniently by the use of a wrench or wrenches applied to either or both of the rivet head and the terminal head, making use of, respectively, the wrenching flange 60 and/or the hexagonal recess 34. Once the swaged rivet head and plug have been separated from each other, it is relatively easy to withdraw or drive out the bulbed shank 54 from the workpiece, together with the plug.

In the case of the rivet 10, in which the swaged rivet head 18 and bulbed shank 16 are integral with each other, in order to disassemble the riveted workpiece, it will first be necessary to remove the plug by unscrewing it from the swaged rivet head and withdrawing or driving it out of the bulbed shank, and then it will be necessary to destroy the interconnection between the rivet head and the blind head. This can be achieved by drilling, to enlarge the bore in either the head or the shank either to a diameter equal to the external diameter of the shank, or sufficiently to enable the interconnection to be broken by reasonable force. The shank can then be forced out of the members of the workpiece, allowing them to be separated.

The relative ease with which the swaged interlock between the rivet head and the helically grooved locking region of the plug can be disengaged by rotation of the plug relative to the rivet head or rivet body, greatly facilitates destruction of the fastener compared with the effort required to destroy a conventional blind rivet which offers no easy way of breaking the interlock between the plug and swaged rivet head.

I claim:

1. A pull and swage to set type self-plugging blind rivet comprising a tubular rivet body of deformable material, and an elongate stem which extends through the rivet body, the body comprising an elongate shank, and a radially enlarged rivet head at one end of the shank, said rivet head being non-integral with said shank, the stem comprising a stem-tail which projects from the head end of the rivet body, and a plug connected to the stem-tail by a breakneck, the plug having a terminal end remote from the stem-tail for abutting the end of the shank remote from the rivet head, and a helical groove extending circumferentially on the plug from the breakneck towards the terminal head, whereby said helical groove receives material of the rivet head which, on installation of the blind rivet, is deformed radially inwardly into the helical groove so that the plug and rivet head are interlocked, and whereby the non-integral construction of said shank and said rivet head permits removal of said tubular rivet body from a workpiece after installation of said blind rivet and after the separation of said stem from said rivet body by rotation of said stem relative to said rivet body.

2. A self-plugging blind rivet as claimed in claim 1, wherein the breakneck forms the root of an annular groove into which the helical groove runs.

3. A self-plugging blind rivet as claimed in claim 1, wherein the helical groove defines, between adjacent turns thereof, a helical thread having the form of a conventional screw thread.

4. A self-plugging blind rivet as claimed in claim 1, wherein the rivet head comprises a swageable crown portion and a radially further enlarged flange having wrenching flats and positioned between the crown portion and the shank.

5. A self-plugging blind rivet as claimed in claim 1, wherein the terminal head of the plug is provided with wrenching flats.

6. A self-plugging blind rivet as claimed in claim 1, wherein the plug has a hexagonal recess extending axially into the terminal head.

7. A self-plugging blind rivet as claimed in claim 1 wherein the rivet head has an inwardly protruding annular retaining lip frictionally engaging the stem for retaining the stem within the rivet head.

* * * * *